Dec. 28, 1937.　　　E. A. ROCKWELL　　　2,103,641
POWER BRAKE SYSTEM
Filed July 21, 1933　　　4 Sheets-Sheet 1
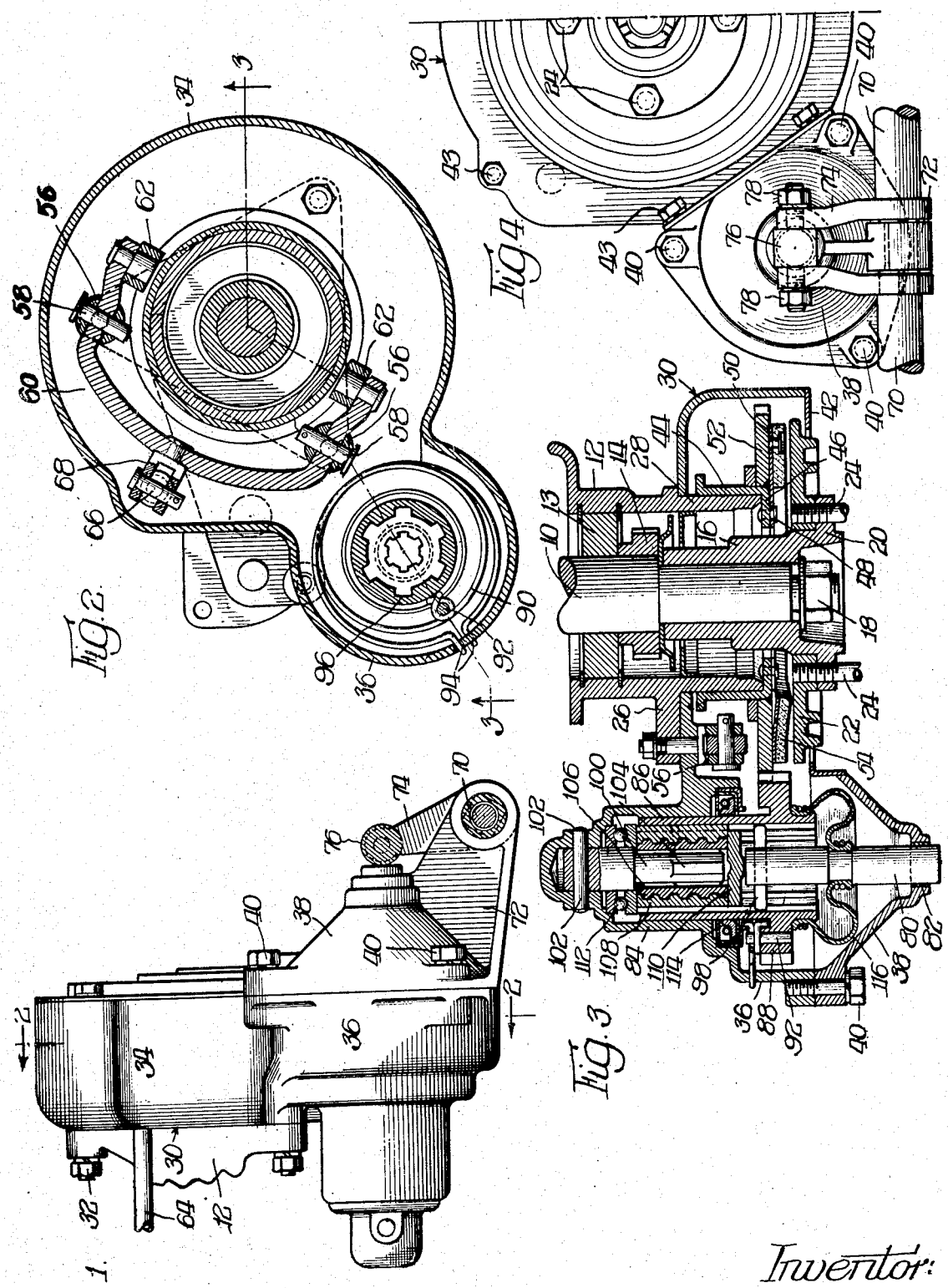
Inventor:
Edward A. Rockwell,

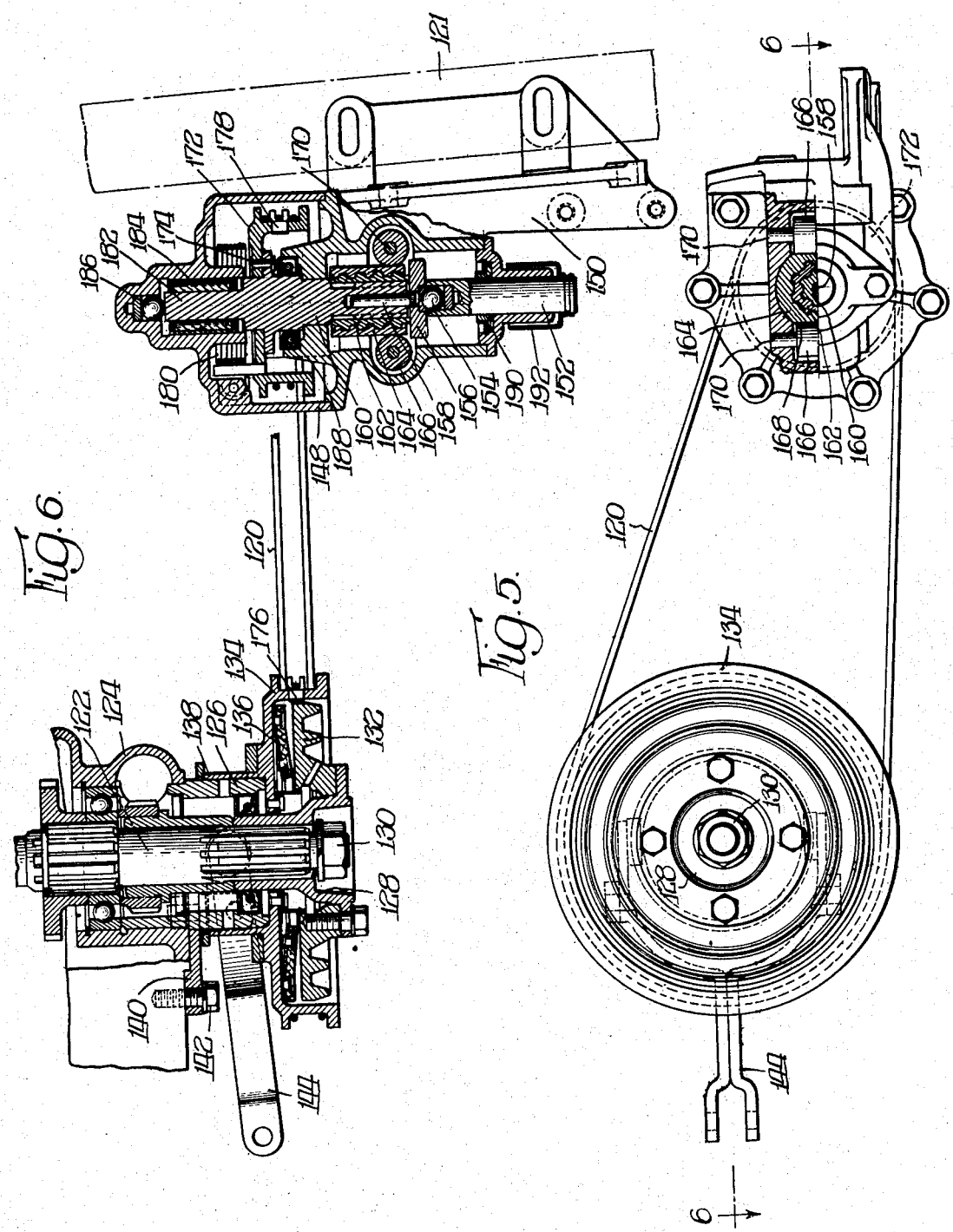

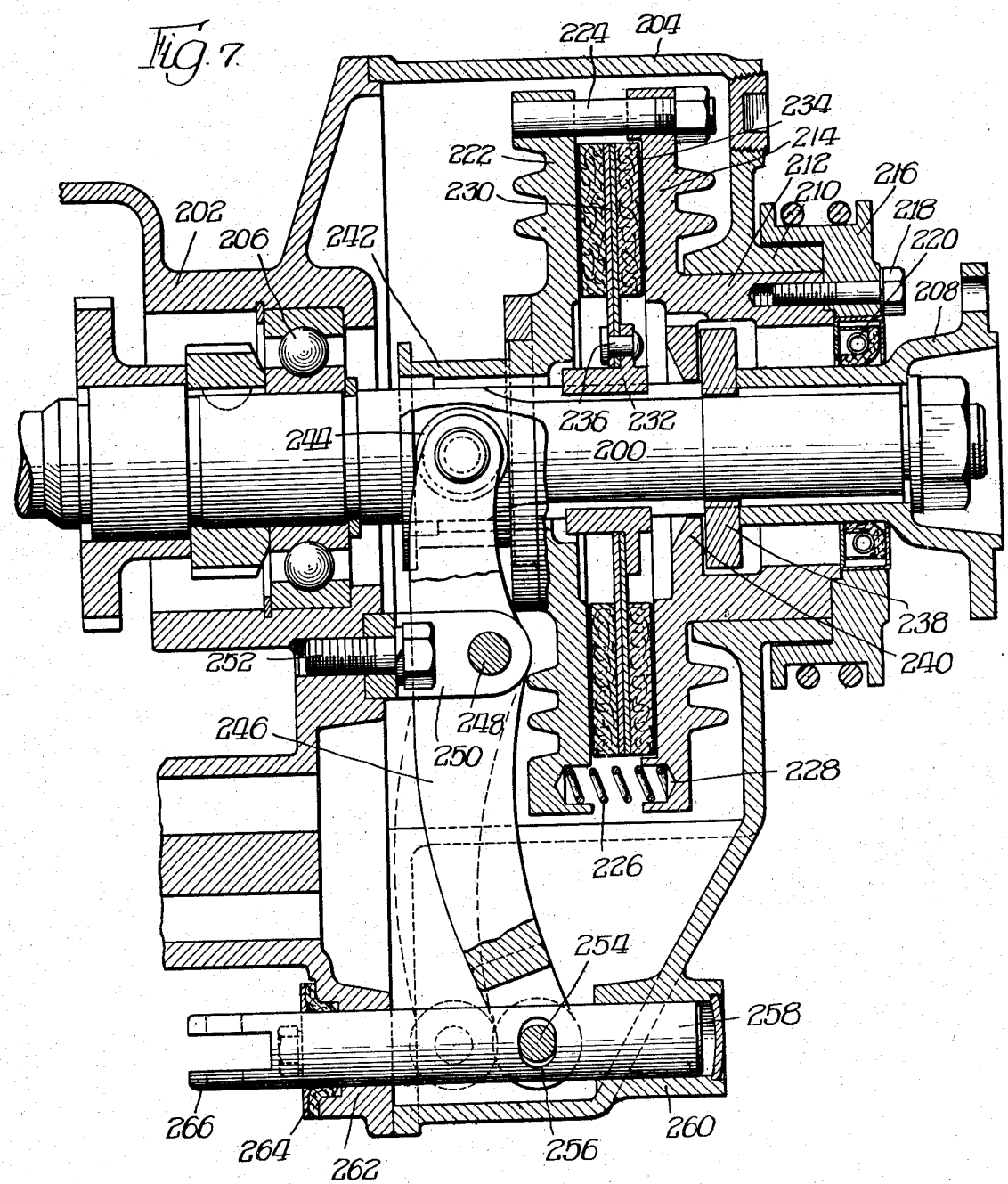

Dec. 28, 1937.  E. A. ROCKWELL  2,103,641
POWER BRAKE SYSTEM
Filed July 21, 1933    4 Sheets-Sheet 4
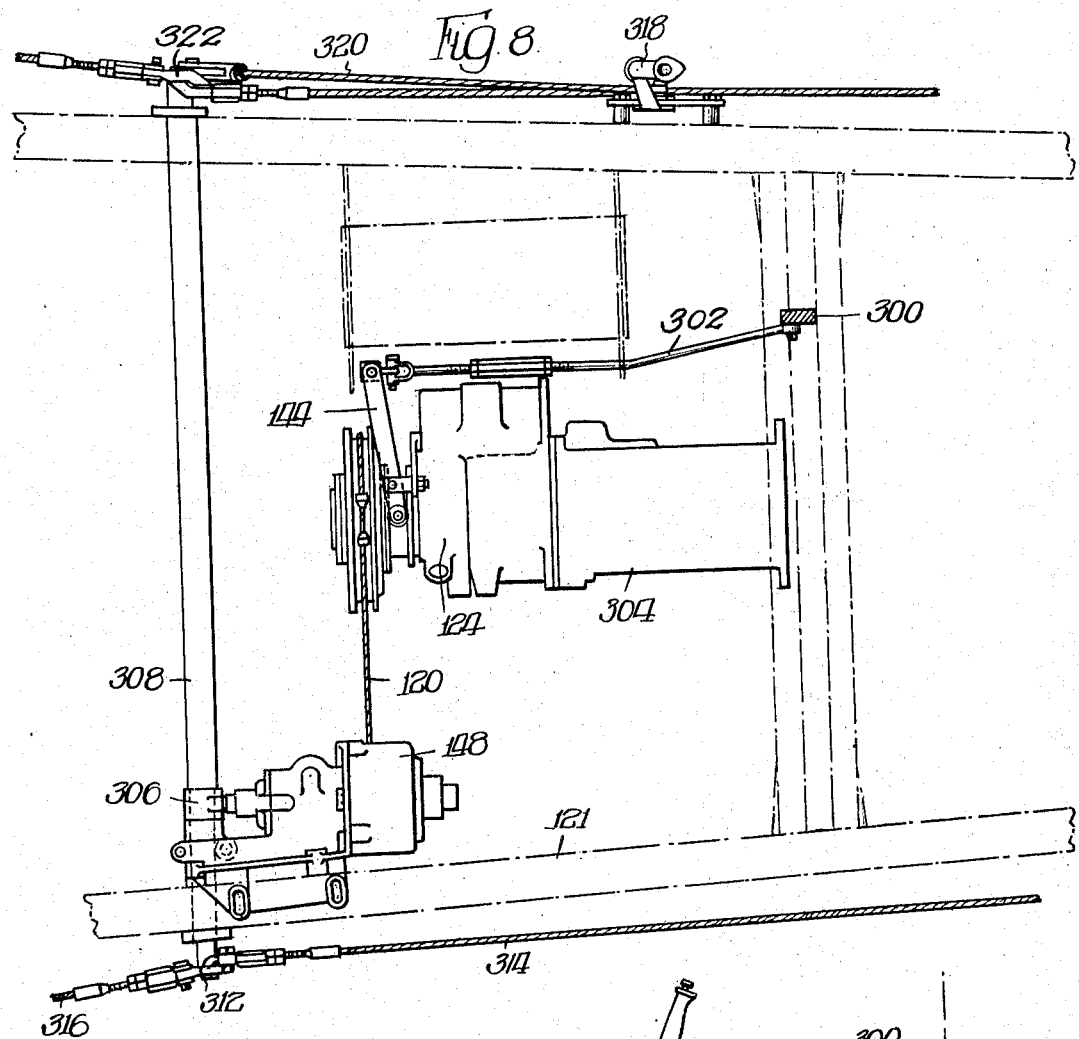
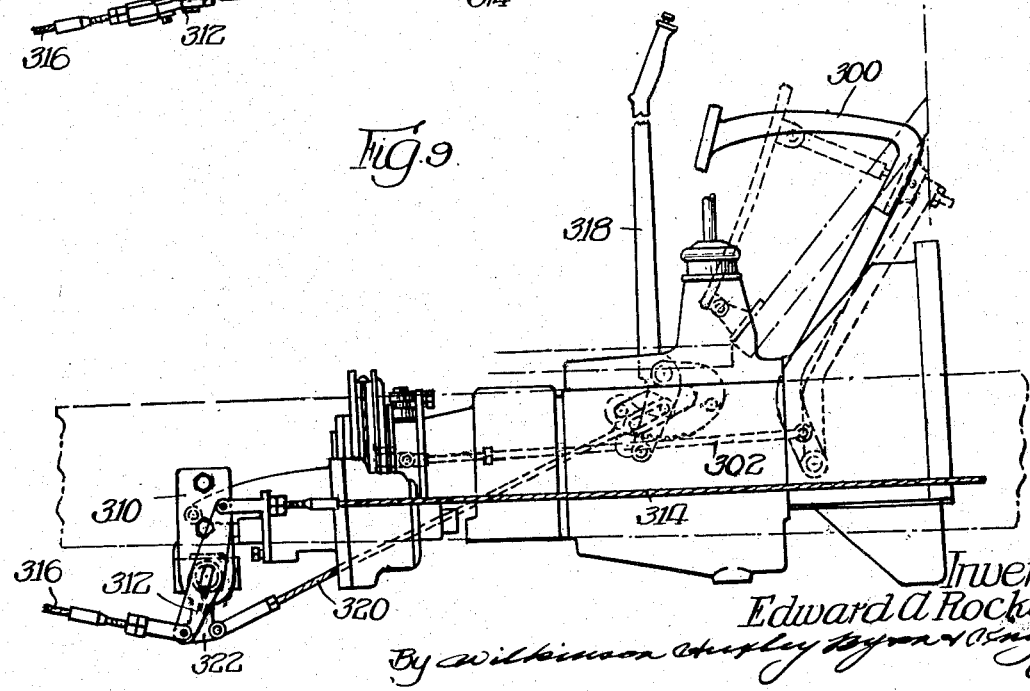
Inventor:
Edward A. Rockwell Patented Dec. 28, 1937

2,103,641

UNITED STATES PATENT OFFICE 2,103,641

POWER BRAKE SYSTEM

Edward A. Rockwell, Chicago, Ill., assignor, by mesne assignments, to General Auto Parts Corporation, a corporation of Delaware Application July 21, 1933, Serial No. 681,483

24 Claims. (Cl. 188—140)

This invention relates to improvements in power brake systems for motor vehicles particularly of the mechanical type in which the pedal pressure of the operator is amplified by power derived from the propeller shaft of the vehicle to develop a desired braking force for applying the standard wheel brakes of the vehicle.

Mechanical power brake systems of this general type are now well known in the art and essentially comprise a power amplifying unit which is initially brought into operation by frictional coupling with the propeller shaft so that the input force derived from the brake pedal is proportionately amplified and delivered as an output braking force. The control unit portion or the means through which the frictional coupling with the propeller shaft is obtained and the actuator or force multiplying unit have generally been directly associated. In one system the control unit and force multiplying unit have been positioned in an offset relation to the propeller shaft but coupled thereto by gearing in order that the speed of the driving member of the control unit may be geared down with respect to the propeller shaft. This is open to the objection that the gear reduction is in operation during movement of the vehicle.

It is an object of my invention to disclose a power brake system in which the control unit, consisting of the driving and driven clutch members, is directly associated with the propeller shaft while the force multiplying unit is offset with respect to the propeller shaft and is coupled to the control unit by gearing or by a cable drive. This arrangement has the advantage that all the parts are normally stationary except the driving clutch member, which rotates at the speed of the propeller shaft. The construction has the further advantage that the force multiplying unit may be positioned at any convenient point on the vehicle chassis for transmitting its output force to the wheel brake linkage.

It is further an object of my invention to disclose improvements in the design and construction of the control unit and in the design and construction of the force multiplying unit particularly to obtain smooth and efficient action through lubrication and by the use of anti-friction bearings.

Further and additional objects and advantages of my improvements will be more readily apparent from the following description taken in connection with the attached drawings, in which—

Figure 1 is an elevation of the power brake unit;

Figure 2 is a section on the plane indicated 2—2 in Figure 1;

Figure 3 is a section on the plane indicated 3—3 in Figure 2;

Figure 4 is an end elevation;

Figure 5 is an end elevation of a modified construction;

Figure 6 is a section on the plane indicated 6—6 in Figure 5;

Figure 7 is a cross section of a further modification of the control unit;

Figure 8 is a partial plan view showing the installation of the constructions shown in Figures 5 and 6 in a vehicle chassis and in association with the brake linkage, and Figure 9 is a side elevation of Figure 8.

In the embodiment disclosed in Figures 1 to 4, inclusive, the propeller shaft 10 extends rearwardly from the transmission casing, partially shown at 12. The shaft 12 is supported by bearing 13 in the casing 12. The usual speedometer gear is indicated 14. A drive sleeve 16 is keyed to the shaft 10 and secured thereto by the nut 18. The drive sleeve 16 at its outer end is flanged as at 20 to constitute part of the usual universal joint. A friction clutch disk 22 is fastened to the flange 20 of the sleeve 16 by the bolts 24. The casing 12 has a flanged rib 26 and a tubular portion 28, which partially encloses the drive sleeve 16.

A power unit casing 30 is mounted on the tubular portion 28 of casing 12 and is suitably fastened to the flange 26 by bolts 32. The casing 30 has a main portion 34 surrounding the clutch disk 22 and an offset portion 36 which forms a housing for an amplifying unit, as will be later described.

The offset portion 36 has fastened thereto a cap 38 held by bolts 40. A shield 42 may also be secured by bolts 43 to the casing 30 to overlap the peripheral edge of the friction disk 22 and to form a substantially enclosed structure.

A sleeve 44 is rotatably mounted on the tubular portion 28 of casing 12. The sleeve 44 has an inwardly flanged outer end 46 to which is fastened by suitable rivets 48 a control clutch disk 50. The disk 50 includes a gear 52 and a fabric friction ring 54 which faces towards the clutch disk 22. The disk 50 is normally stationary but may be brought into frictional engagement with the disk 22 which is driven from the propeller shaft, whereupon the disk 50 will be frictionally rotated. The clutch disk 50 may be resilient in construction, as shown, to modulate the gripping action.

A pair of supports 56 are secured within the casing 30 and carry pins 58 for pivotal support of a yoke 60. The arms of the yoke 60 carry rollers 62 which are adapted to be forced against the forward side of the gear 52. An operating member 64 extends into the casing and is pivotally attached by pin 66 to a clevis 68 fastened to the yoke 60.

It will be apparent that by moving the rod 64 through actuation of the usual brake pedal, the disk 50 will be brought into rotation by contacting with the rotating disk 22. The rotation of the gear 52 is transmitted by suitable actuating means to operate the rockable brake shafts 70 which are mounted in a bracket 72 integral with the cap 38. The shafts 70 have fixed thereto a pair of lever arms 74. The outer ends of lever arms 74 are connected by a thrust receiving roller 76 held in position by bolts 78. The roller 76 is engaged by an axially displaceable output actuator 80 extending outwards through a bearing 82 in the casing cap 38.

The casing 36 has a cylindrical portion 84 forming an internal bearing support for a rotatable sleeve 86 integral with a gear 88 meshing with the gear 52. The sleeve 86 and gear 52 are held in normal position by a spring element 90 connected by pin 92 to the gear 88 and connected at its ends 94 to the casing 36.

The sleeve 86 in gear 88 has internal axial keyways 96 and the actuator 80 is fixed to rotate with the gear 88 by a pin 98 engaging the keyways 96 which, however, permits axial displacement of the actuator 80 with respect to the gear.

Fixedly positioned within the cylindrical portion 84 of the casing is a centrally disposed support 100 held against rotation with respect to the casing 84 by a pin 102. The outer end of the support 100 which extends towards the actuator 80 is provided with exterior splines 104. The splines 104 constitute a mounting for a non-rotatable but axially displaceable sleeve 106 formed with an exterior spiral thread. A second sleeve 108 is internally spiralled and coupled to the sleeve 106. The sleeve 108 is splined to the keyways 96 of the outer sleeve 86 for rotation therewith. The rear or outer ends of the sleeves 106 and 108 engage a movable thrust abutment 110 which in turn bears against the inner end of the output actuator 80. The forward or inner ends of the sleeves 106 and 108 engage an anti-friction thrust bearing 112 which is mounted on the support 100.

The spiral sleeves 106 and 108 and the bearing for the sleeve 86 should be well lubricated. I show an oil seal unit 114 positioned in the casing 36 and engaging the outer portion of the drive sleeve 86 to retain the lubricant in the bearing therefor and the output actuator 80 and gear 88 have fastened therebetween a flexible boot 116. The lubricant is therefore retained between the oil seal 114 and the boot 116.

In operation the operator, by movement of the rod 64, will cause pivotal movement of the yoke 60 and axial displacement of the disk 50 to bring the fabric friction ring 54 into engagement with the friction surface of the rotatable disk 22. The rotation of the gear 52 will produce a partial rotation of the offset gear 88 and corresponding rotation of the outer spiral sleeve 108. Since the spiral sleeve 106 is held against rotation through its connection with the support 100, it will be apparent that one of the sleeves 106 or 108, dependent upon the direction of rotation, will be axially displaced in a rearward and outward direction to move the abutment 110 and transmit an axial displacement to the actuator shaft 80. The amplified force of the outward thrust of the actuator 80 will produce application of the wheel brakes of the vehicle through rocking of the brake shaft 70.

In the modified constructions of Figures 5 and 6 the actuator unit is coupled to the control unit by a cable 120 instead of being geared thereto as in the first embodiment described. The control unit is similar in most respects to the control unit previously described except that it is not enclosed in a casing. The propeller shaft 122 extends rearwardly from the transmission casing 124, which has mounted therein a sleeve 126. The drive sleeve 128 is splined to the propeller shaft 122 and held in position by a nut 130. The sleeve 128 has bolted thereto the friction disk 132. The disk 132 is positioned within the drum-shaped member 134 which has riveted thereto a friction disk 136 provided with a suitable annular fabric lining. The drum 134 is mounted by a flanged sleeve 138 upon the sleeve 126. A support 140 fastened by bolt 142 to the transmission casing constitutes a mounting for a pivoted yoke-shaped input lever 144, the arms of which are in operative engagement with the drum 134 and the flanged sleeve 138. Operation of the lever 144 will serve to move the drum 134 axially to bring the fabric lining of the disk 136 into frictional engagement with the disk 132.

The actuator unit 148 may be mounted by a bracket 150 upon the chassis frame and includes an axially displaceable output member 152. The inner end of the output member 152 has mounted therein a ball bearing 154 to transmit the thrust from the abutment 156 which in turn is guided by the pin 158 sliding within the rotatable driving member 160. An externally spiralled inner sleeve 162 is splined to the driving member 160. An internally spiralled outer sleeve 164 is held against rotation by the engagement of rollers 166 with the flat faces 168 on the opposite sides of the sleeve. The rollers 166 are mounted on pins 170 fixedly positioned in the casing 148.

The driving member 160 is attached to the input drum 172 by rivets 174. The cable 120 is connected at 176 to the control drum 134 and at 178 to the actuator drum 172. The drum 172 is held in normal position by a spring 180. The end 182 of the nut 160 is supported by roller bearings 184 and at its end face engages a thrust bearing 186. A suitable oil seal 188 is provided contacting the member 160 and an additional oil seal 190 is positioned at the outer end of the casing engaging the slidable actuator 152. The actuator 152 may have fixed thereto a cap 192 as a further protection against leakage of lubricant.

It will be appreciated that with the propeller shaft rotating the disk 132 of the control unit will be driven at the speed of the propeller shaft but the drum 134 and all parts of the actuator unit will be normally stationary. The operator through suitable linkage may move the input lever 144 to frictionally couple the drum 134 with the disk 132 whereupon through the cable 120 the shaft 160 of the actuator unit will be rotated from its normal position. This relative rotation of the inner spiral sleeve 162 with respect to the outer spiral sleeve 164 will cause an axial displacement of one of the sleeves in a direction to move the output member 152 and to apply the wheel brakes through suitable connecting linkage.

In Figure 7 a further modification of the control unit is disclosed. In this form the friction clutch members run in lubricant in a casing which is in communication with the transmission casing. The propeller shaft 200 rearwardly extends from the transmission casing 202. The control unit casing 204 is suitably secured to the casing 202. The shaft 200 is rotatably supported by a ball bearing unit 206 mounted in the casing 202 and at its rear end the shaft 200 has keyed and bolted thereto a universal joint connection sleeve 208. The casing 204 has an annular portion 210 constituting a bearing for the rotatable support of the hub 212 of friction disk 214. An output drum 216 is secured to the hub 212 by bolts 218. Mounted in the outer end of the drum 216 is an oil seal unit 220 bearing against the connection sleeve 208 to prevent the loss of lubricant from the casing. An additional friction disk 222 is provided corresponding to but oppositely disposed with respect to the friction disk 214. The disks 214 and 222 are connected for rotation as a unit by bolts 224 which permit relative axial movement between the disks. The disks are normally held apart by springs 226 seated in sockets 228 formed in the disks.

The driving clutch member 230, which rotates between the opposing surfaces of the friction disks 214 and 222 includes a hub 232 splined to the shaft 200 for rotation therewith but capable of axial movement with respect to the shaft. The marginal portion of the rotatable disk which includes oppositely facing fabric friction rings 234 is attached to the hub by rivets 236. A thrust collar 238 is mounted on the shaft 200 and abuts against the forward end of the connection sleeve 208. The friction disk 214 is formed with a radial flange 240, which is adapted to engage the thrust collar 238 when the control unit is brought into operation.

The friction disk 222 is formed with a drum-shaped hub portion 242 forming a raceway for rollers 244 carried by the arms of the input yoke 246. The yoke 246 is pivotally supported at 248 upon a bracket 250 secured by bolts 252 to the transmission case 202. The lower end of the yoke 246 carries a pin 254 fitting in a slotted opening 256 formed in the slidable input member 258. The member 258 is supported at its rear end by a bearing portion 260 of casing 204 and extends through a bearing opening 262 formed in the transmission case 202. An oil seal 264 is provided to seal the bearing opening 262 against loss of lubricant from the casing. The outer end of the input member 258 is formed with a clevis 266 to which suitable input linkage may be connected.

The operation of this control unit is similar to those previously described in that operation of the input will bring the rotatable and the normally stationary friction clutch members into engagement thereby producing a partial rotation of the output drum 216. This movement of the output drum may be transmitted by a cable as shown in Fig. 6 to a suitable actuator and amplifying unit. This design of control unit provides however an increased area of frictional contact and by having the friction members run in oil, the heat developed is rapidly dissipated.

Figures 8 and 9 illustrate the assembly of the power unit and the amplifier unit with the brake linkage of the chassis. The brake pedal 300 is connected by link 302 to the input lever 144 of the power unit which is mounted on the transmission case 124. The transmission case is rigidly secured to the engine frame 304 which, in turn, is usually carried by rollers mounted upon the frame. Since the amplifier unit 148 is rigidly secured to the chassis frame 121, there must necessarily be some provision for relative movement between the power unit and the amplifier unit. The use of the flexible cable 120 between the output of the power unit and the input of the amplifier unit takes care of the relative movement that must occur. The units are therefore flexibly coupled. The output thrust from the amplifier unit 148 is transmitted to lever arm 306 fixed to the rock shaft 308 which is supported at its end by brackets 310 fixed to the chassis frame. Double arm levers 312 and 322 are provided at the ends of the rock shaft 308 through which are connected the cables 314 for actuating the front brakes and the cables 316 for actuating the rear brakes. An emergency lever 318 is also shown connected by link 320 to the lever arm 322 secured to one end of the rock shaft 308.

I claim:

1. Power brake operating mechanism for motor vehicles including a control unit concentrically positioned with respect to the propeller shaft of the vehicle and actuator means offset with respect to the propeller shaft, said control unit comprising a clutch element fixed to and rotatable with the propeller shaft, a second normally stationary clutch element concentrically positioned with respect to the first-mentioned clutch element, input means for bringing said clutch elements into engagement, said offset actuator means comprising a driving member coupled to said second clutch element and rotatable in either direction dependent upon the direction of rotation of the propeller shaft, a reciprocable output member and means for transmitting brake actuating movement to said output member in the same direction from said driving member regardless of the direction of rotation thereof.

2. Power brake mechanism for motor vehicles comprising a control unit concentrically positioned with respect to the propeller shaft of the vehicle, actuator means offset with respect to said power shaft, said control unit comprising a pair of clutch elements, one of which is fixed with respect to said propeller shaft to constitute a driving member and the other clutch element being a normally stationary driven member, input means for bringing said clutch members into engagement, said offset actuator means comprising a normally stationary driving member coupled to the driven member of the control unit, a slidable output member, means for transmitting an output thrust to said output member in the same direction regardless of the direction of rotation of said driving member, a casing for said actuator means and lubricant sealing means for said casing.

3. Power brake mechanism for motor vehicles comprising a control unit concentrically positioned with respect to the propeller shaft of the vehicle normally stationary actuator means offset from the propeller shaft of the vehicle but adapted to derive rotation therefrom upon actuation of said control unit, comprising a casing, an input driving member rotatably mounted in said casing, a slidable output member, a pair of relatively displaceable spirally coupled sleeves, one of said sleeves being keyed for rotation with said driving member and the other of said sleeves being retained against rotation with respect to said casing, abutment means preventing displacement of said sleeves in one direction and a movable thrust abutment for transmitting relative axial displacement of said sleeves to said output member in the other direction.

4. Power brake mechanism for motor vehicles comprising a control unit concentrically positioned with respect to the propeller shaft of the vehicle normally stationary actuator means offset from the propeller shaft of the vehicle but adapted to derive rotation therefrom upon actuation of said control unit, comprising a casing, an input driving member rotatably mounted in said casing, a slidable output member, a pair of relatively displaceable spirally coupled sleeves, one of said sleeves being keyed for rotation with said driving member and the other of said sleeves being retained against rotation with respect to said casing, abutment means preventing displacement of said sleeves in one direction, a movable thrust abutment for transmitting relative axial displacement of said sleeves to said output member in the other direction and means for retaining lubricant in said casing for lubrication of said sleeves.

5. Power brake mechanism for motor vehicles comprising a control unit concentrically positioned with respect to the propeller shaft of the vehicle normally stationary actuator means offset from the propeller shaft of the vehicle but adapted to derive rotation therefrom, comprising, a casing, an input driving member rotatably mounted in said casing, a slidable output member, a pair of relatively displaceable spirally coupled sleeves, one of said sleeves being keyed for rotation with said driving member and the other of said sleeves being retained against rotation with respect to said casing, abutment means preventing displacement of said sleeves in one direction, a movable thrust abutment for transmitting relative axial displacement of said sleeves to said output member in the other direction and resilient means for normally retaining said input driving member in a definite position with respect to said casing.

6. Power brake mechanism for motor vehicles including normally stationary actuator means offset from the propeller shaft of the vehicle but adapted to derive rotation therefrom comprising, a casing, an input driving member rotatably mounted in said casing, a slidable output member, a pair of relatively displaceable spirally coupled sleeves, one of said sleeves being keyed for rotation with said driving member and the other of said sleeves being retained against rotation with respect to said casing, abutment means preventing displacement of said sleeves in one direction, a movable thrust abutment for transmitting relative axial displacement of said sleeves to said output member in the other direction, said sleeves being disposed within said driving member and lubricant sealing means between said casing and said driving member, and a flexible boot connecting said output member and said driving member.

7. Power brake mechanism for motor vehicles including normally stationary actuator means offset from the propeller shaft of the vehicle but adapted to derive rotation therefrom, comprising, a casing, an input driving member rotatably mounted in said casing, a slidable output member, a pair of relatively displaceable spirally coupled sleeves, one of said sleeves being keyed for rotation with said driving member and the other of said sleeves being retained against rotation with respect to said casing, abutment means preventing displacement of said sleeves in one direction and a movable thrust abutment for transmitting relative axial displacement of said sleeves to said output member in the other direction, the means for retaining one of said sleeves against rotation with respect to said casing comprising rollers mounted in said casing and engaging opposite flat sides of said sleeve.

8. Power brake mechanism for motor vehicles including a control unit concentrically positioned with respect to the propeller shaft of the vehicle comprising a control unit casing, a pair of clutch elements within said casing, one of said clutch elements being normally coupled for rotation with said propeller shaft, an output drum on the exterior of said casing fixed for rotation with the other of said clutch elements, input means extending into said casing for forcing said clutch elements into frictional engagement and lubricant sealing means for retaining lubricant within said casing whereby said clutch elements operate within the lubricant of said casing.

9. Power brake operating mechanism for motor vehicles including a control unit concentrically positioned with respect to the propeller shaft of the vehicle and comprising a pair of clutch elements, one of which is fixed to said propeller shaft, an output drum fixed for rotation with the other of said clutch elements, input means for forcing said clutch elements into engagement, brake actuator means comprising a casing fixed to the chassis frame of the vehicle, an input drum, a cable connecting the output drum of the control unit to the input drum of the actuator unit, a slidable output member concentrically positioned with respect to the input drum of the actuator unit and means including a pair of spirally coupled sleeves for converting the rotation of said input drum into slidable movement of the output member in the same direction regardless of the direction of rotation of the propeller shaft.

10. A force multiplying unit for use in power brake systems comprising a casing, an input member rotatably mounted in said casing, a pair of spirally coupled sleeves, means holding the inner sleeve against rotation with respect to said input member but permitting axial displacement thereof, roller means mounted in said casing engaging the outer sleeve to hold said outer sleeve against rotation with respect to said casing but permitting axial displacement thereof and a slidable output member mounted in said casing and protruding outwardly thereof, said output member being moved in an operative direction by the axial displacement of either of said sleeves from the normal position thereof caused by rotation of the input member.

11. A force multiplying unit for use in power brake systems comprising a casing, an input member rotatably mounted in said casing, resilient means in said casing acting between said casing and said input member to hold said input member in a normal position with respect to said casing, a pair of spirally coupled sleeves, means holding the inner sleeve against rotation with respect to said input member but permitting axial displacement thereof, means holding the outer sleeve against rotation with respect to said casing but permitting axial displacement thereof and a slidable output member mounted in said casing moved by axial displacement of either of said sleeves from normal position thereof.

12. A force multiplying unit for use in a power brake system comprising a casing, an input member rotatably mounted in said casing, a pair of spirally coupled sleeves in said casing, means holding the inner sleeve against rotation with respect to said input member, but permitting axial displacement thereof, roller means mounted in said casing for holding the outer sleeve against rotation with respect to said casing but permitting axial displacement thereof, an output member slidably mounted in said casing and protruding therefrom, a thrust bearing in said casing engaging the inner end of said input member and a thrust bearing adjacent the outer end of said input member through which an axial displacement of either of said sleeves is transmitted to said output member.

13. A force multiplying unit for use in power brake systems comprising a casing, an input gear member having an integral sleeve rotatably mounted in said casing, a pair of spirally coupled sleeves positioned within the sleeve of said gear member, means preventing rotation of the outer sleeve with respect to said gear member but permitting axial displacement thereof, means preventing rotation of the inner sleeve with respect to said casing but permitting axial displacement thereof, an output member slidably mounted in said casing and protruding therefrom, the inner end of said output member being supported within the sleeve of said gear member, a thrust abutment bearing for the inner ends of said spirally coupled sleeves and a thrust member between the outer ends of said sleeves and said output member whereby rotation of said gear member produces an axial displacement of one of said sleeves to actuate said output member.

14. In a power brake system, a power unit, an input means associated with said power unit for bringing said power unit into action, output means for transmitting movement from said power unit, an amplifier unit adapted to be oscillated by and independently mounted with respect to said power unit, said amplifier unit having an input and an output coupled for relative rotary oscillation and means for flexibly coupling the output of the power unit to the input of the amplifier unit.

15. In a power brake system for motor vehicles, a chassis, a transmission casing associated with said chassis, a power brake unit carried by said transmission casing, operator controlled input means for said power unit, an amplifier unit rigidly mounted on said chassis frame, a flexible coupling for transmitting by oscillation the output movement of said power unit to the input of said amplifier unit, said amplifier unit having output means coupled for relative rotary oscillation with the amplifier input for transmitting brake actuating movement to the wheel brake linkage.

16. In a power brake system for motor vehicles, a propeller shaft, a normally inactive power unit, a clutch associated with said propeller shaft, a power amplifier unit spaced from said clutch unit, an oscillatory flexible cable connecting said clutch unit to said amplifier unit, input means for bringing said clutch unit into action to derive movement from said propeller shaft and output means for transmitting brake actuating movement from said amplifier unit by relative rotary oscillation.

17. A power amplifier having an input means and an output means relatively rotatable with regard to the input means for work performing movement and a rotatably movable retracting spring for bringing one of said means back to its initial relative position with regard to the other said means.

18. A power amplifier having a plurality of members provided with cooperating mutually contacting inclined surfaces, one of which is rotatable relatively to the other, and a roller adapted to take the force of the reaction of one of said members.

19. In combination, a pedal, a friction member adapted to be controlled thereby, an actuator comprising a plurality of members with inclined surfaces adapted to be brought into action by the friction member to produce longitudinal movement of one of the actuator members, and opposing rollers having a unitary support adapted to support one of said inclined surface members to decrease the friction produced by said longitudinal movement.

20. In a power source, a propeller shaft, a power amplifier having input and output means, the output means and a part of the input means being positively and slidably coupled together for rotative work performing movement, the power source being provided with a rotative friction means, the input means including a friction member normally stationary, concentric with the propeller shaft, and being adapted to be moved longitudinally into and out of engagement for its rotative movement with the rotative friction means of said power source for the control and release thereof.

21. In a power source, a propeller shaft, a power amplifier having input and output means, the output means and a part of the input means being positively and slidably coupled together for rotative work performing movement, the power source being provided with a rotative friction means, and cooperating spiral surfaces, one of which is adapted to remain stationary and the other of which is adapted to advance and return for the said work performing movement, the power source including a friction member normally stationary, concentric with the propeller shaft, and being adapted to be moved longitudinally into and out of engagement with the rotative friction means of said power source for the control and release thereof.

22. A work amplifying device comprising an automotive vehicle propeller shaft, a friction member slidably splined on the shaft, an output driven member, an input member for controlling the driven member, the output member being adapted to be coupled with the friction member by thrust engagement for work performing relatively oscillatory rotary movement, a plurality of members being coupled to the output member, having relatively inclined cooperating surfaces in which relatively oscillatory rotary movement is produced.

23. A work amplifying device comprising an automotive vehicle propeller shaft, a friction member coupled on the shaft, an output driven member, an input member for controlling the driven member, the output member being coupled to the input member for relative movement to and from the input member and adapted to be coupled with the friction member for work performing relatively oscillatory rotary movement, a plurality of members being coupled to the output member having relatively inclined cooperating surfaces in which relatively oscillatory rotary movement is produced.

24. A work amplifying device comprising an automotive vehicle propeller shaft, a friction member coupled on the shaft, an output driven member, an input member for controlling the driven member, the output member being adapted to be coupled with the friction member for work performing relatively oscillatory rotary movement a plurality of members being coupled to the output member, having relatively inclined cooperating surfaces in which relatively oscillatory rotary movement is produced, the shaft being rotatable with regard to the output member, and a thrust bearing for receiving the output member.

EDWARD A. ROCKWELL.